2,882,233
Patented Apr. 14, 1959

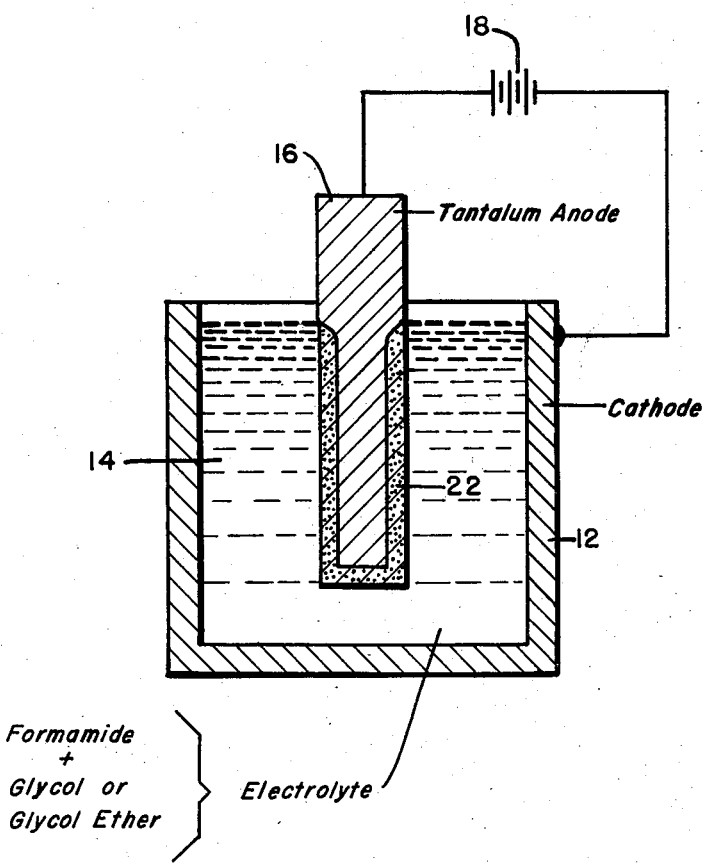

2,882,233

FORMING ELECTROLYTE FOR CAPACITORS

Kurt O. Otley, Washington, D.C., assignor to the United States of America as represented by the Secretary of the Army Application March 2, 1956, Serial No. 569,214

1 Claim. (Cl. 252—62.2)

(Granted under Title 35, U. S. Code (1952), sec. 266)

The invention described herein may be manufactured and used by or for the Government for governmental purposes without payment to me of any royalty thereon.

This invention relates to forming tantalum capacitors and more particularly to the electrolyte used both in forming and in operation.

Electrolytic capacitors are capacitors using a metal plate for one electrode; an oxide film on that plate for the dielectric material; and a conductive liquid, called electrolyte, for the other electrode. Generally, a capacitor unit consists of several plates separated by insulating spacers in a metal container which forms one terminal of the unit. In manufacture, the oxide film is formed by electrolysis. The voltage at which the capacitor operates cannot be higher than that used in the forming process.

A need exists for electrolytic capacitors that may be formed at as high as 1000 volts and operated over a wide temperature range without the capacitance changing. It is desirable to use the same electrolyte in operation that was used to form the capacitor so that it will have better reforming or self-healing characteristics—i.e., if a defect occurs on the oxide film, the area will reoxidize.

I have found that electrolytes consisting of a mixture of an amide and a glycol or a mixture of an amide and a glycol derivative permit forming at high voltages and operation over a wide temperature range.

An object of this invention is to provide an electrolytic capacitor which will operate at high voltages.

Other objects are to provide an electrolytic capacitor which has a long shelf life and stable characteristics over a wide temperature range.

Further objects are to achieve the above with a device that is sturdy, simple, and reliable, yet cheap and easy to manufacture.

The specific nature of the invention as well as other objects, uses and advantages thereof will clearly appear from the following description and from the accompanying drawings, in which:

The drawing is a vertical section of apparatus for forming a tantalum electrode in accordance with the invention.

In the drawing, a metallic vessel 12 that serves as a cathode contains an electrolyte 14 in which is immersed a tantalum anode 16. A source 18 of direct current is connected between vessel 12 and anode 16. Current flowing through electrolyte 14 causes a film 22 of tantalum oxide to be formed on anode 16, hydrogen being simultaneously liberated at the cathode vessel 12.

It is understood that tantalum is a common metal for high quality electrolytic capacitors; however, niobium (columbium) is also used and zirconium and hafnium are contemplated. These metals are all refractory metals whose oxides have good dielectric properties.

The electrolyte 14 is chosen from a group of chemical compounds which have a certain range of conductivity. If the conductivity is not high enough, the film 22 will not form within a practical length of time. If the conductivity is too high, sparking will occur at the anode 16 at relatively low forming voltages, making defects in the oxide film 22. Also it is desirable that the electrolyte be liquid over a wide range of temperatures; that is, the freezing point should be low and the boiling point high. Aside from the point that the electrolyte must be liquid for the capacitor to operate properly, the electrolyte must have stable properties, especially electrical, over the operating range. A further necessary characteristic of an operating electrolyte is that it must be relatively chemically stable, and certainly the products of decomposition must not be harmful to the extent that they affect the chemical and electrical properties of the oxide film or the electrolyte.

Preferred electrolytes in accordance with the invention comprise one mol of formamide mixed with between 0.5 and 10 mols of condensation products of ethylene glycol, in which the number of glycol molecules is low, such as diethylene glycols or triethylene glycol; or alkyl ethers of a low number of carbon atoms, derived from these compounds, particularly diethylene glycol monobutyl ether, diethylene glycol dibutyl ether, triethylene glycol monobutyl ether, or diethylene glycol monoethyl ether.

One mixture showing very good results was one mol formamide with three mols diethylene glycol monobutyl ether (DEGMBE). The resistivity of the electrolyte was about 190,000 ohms per sq. cm. Various mixtures showed the following results, with tantalum foil and a forming voltage of 1,000 volts:

| Mols | | Leakage Current ($\mu$a. per in.$^2$) @ 1,000 v. |
|---|---|---|
| Formamide | DEGMBE | |
| 1 | 2 | 150 |
| 1 | 3 | 28 |
| 1 | 4 | 70 |

The following data were observed for other mixtures of these two compounds:

| Mols | | Maximum Forming Voltage | Electrolyte Resistivity, ohms |
|---|---|---|---|
| Formamide | DEGMBE | | |
| 1 | 1 | 800 | 35,000 |
| 2 | 1 | 500 | 18,000 |

The mixture was operable within a range of ⅓ to 20 mols of the glycol ether to one mol formamide.

Good results were also obtained using formamide and diethylene glycol or triethylene glycol in the ratio of 1 mol formamide mixed with ½ to 10 mols of glycol, as is indicated below:

| Mols | | Maximum Forming Voltage | Electrolyte Resistivity, ohms |
|---|---|---|---|
| Formamide | Diethylene Glycol | | |
| 1 | 10 | 730 | 150,000 |
| 1 | 3 | 500 | 40,000 |
| 2 | 1 | 400 | 8,000 |

There was no attempt to keep the liquids sealed and some water may have been absorbed from the atmosphere.

It will be apparent that the embodiments shown are only exemplary and that various modifications can be made in construction, materials, and arrangement within the scope of the invention as defined in the appended claim.

I claim:

An electrolyte for use in electrolytic capacitors, said electrolyte consisting of one mol formamide mixed with three mols of diethylene glycol monobutyl ether.

References Cited in the file of this patent

UNITED STATES PATENTS

| | | |
|---|---|---|
| 2,104,733 | Brennan | Jan. 11, 1938 |
| 2,742,416 | Jenny | Apr. 17, 1956 |
| 2,749,487 | Jenny et al. | June 5, 1956 |
| 2,759,132 | Ross | Aug. 14, 1956 |